(12) United States Patent
Hume et al.

(10) Patent No.: US 11,898,977 B2
(45) Date of Patent: Feb. 13, 2024

(54) TEMPERATURE CONTROL DEVICE AND TEMPERATURE CONTROL METHOD

(71) Applicant: Thermtest Inc., Fredericton (CA)

(72) Inventors: Dale Hume, Fredericton (CA); James Kozlowski, Fredericton (CA)

(73) Assignee: Thermtest Inc., Hanwell (CA)

( * ) Notice: Subject to any disclaimer, the term of this patent is extended or adjusted under 35 U.S.C. 154(b) by 955 days.

(21) Appl. No.: 16/592,858

(22) Filed: Oct. 4, 2019

(65) Prior Publication Data
US 2020/0110047 A1    Apr. 9, 2020

Related U.S. Application Data

(60) Provisional application No. 62/766,179, filed on Oct. 5, 2018.

(51) Int. Cl.
| | | |
|---|---|---|
| *F16L 59/06* | (2006.01) | |
| *H05B 3/06* | (2006.01) | |
| *G01N 25/00* | (2006.01) | |
| *F25B 21/04* | (2006.01) | |
| *F25D 13/00* | (2006.01) | |
| *F25B 49/02* | (2006.01) | |
| *F16L 59/02* | (2006.01) | |

(52) U.S. Cl.
CPC ............ *G01N 25/00* (2013.01); *F16L 59/028* (2013.01); *F16L 59/06* (2013.01); *F25B 21/04* (2013.01); *F25B 49/02* (2013.01); *F25D 13/00* (2013.01); *H05B 3/06* (2013.01)

(58) Field of Classification Search
CPC .......... F25D 31/005; F16L 59/06; H05B 3/06; H05B 1/0227; F25B 2321/0212; F25B 2700/2104
See application file for complete search history.

(56) References Cited

U.S. PATENT DOCUMENTS

| | | | | |
|---|---|---|---|---|
| 6,612,116 B2 * | 9/2003 | Fu | ............... | F25D 17/042 62/186 |
| 2004/0107726 A1 * | 6/2004 | Kim | ............ | F25D 17/045 62/159 |
| 2012/0312030 A1 * | 12/2012 | Lu | ............... | F25B 21/02 62/3.2 |
| 2017/0314851 A1 * | 11/2017 | Alexander | ............ | F25D 29/003 |

FOREIGN PATENT DOCUMENTS

WO    WO-2011135863 A1 *  11/2011  ........... F25D 17/065

OTHER PUBLICATIONS

Office Action from counterpart Canadian Application No. 3057475 dated Dec. 28, 2022, 3 pp.

* cited by examiner

*Primary Examiner* — Ana M Vazquez
(74) *Attorney, Agent, or Firm* — Shumaker & Sieffert, P.A.

(57) ABSTRACT

A temperature control device and a temperature control method for use in measuring thermal properties of materials at high and low temperatures are disclosed herein. The temperature control device is configured for controlling a temperature of a test volume inside a test cell and is capable of providing both extremely high and low test volume temperatures over a wide temperature range. The temperature of the test volume is controlled using opposing heating and cooling by controlling a supply of thermal energy to the test cell from a heating subsystem while simultaneously removing thermal energy from the test cell using a cooling subsystem.

20 Claims, 9 Drawing Sheets

TEMPERATURE CONTROL DEVICE AND TEMPERATURE CONTROL METHOD

CROSS-REFERENCE TO RELATED APPLICATIONS

This application claims priority to U.S. Provisional Patent Application No. 62/766,179, filed on Oct. 5, 2018, the contents of which are incorporated herein by reference in its entirety for all purposes.

TECHNICAL FIELD

The present disclosure relates to measuring material properties, and in particular to measuring thermal properties of materials at high and low temperatures.

BACKGROUND

Measuring thermal properties of materials at high and low temperatures generally requires purpose built environmental chambers. However, the existing technology is limited in that systems capable of generating extreme temperatures for measurement are either for generating hot or cold temperatures, but not both, and systems capable of generating both high and low temperatures have limited temperature ranges due to the heating and cooling system designs, which use different methods and materials, and furthermore, are often slow to achieve test temperatures.

That is, separate systems are generally required in order to respectively achieve extremely cold temperatures and extremely high temperatures. Incorporating both of these types of systems is not typically done due to their vastly different characteristics. In addition, environmental chambers configured for both heating and cooling are generally larger, which increases purchase and operational costs and increases the time to reach the test temperature.

Accordingly, methods and equipment for measuring thermal properties of materials at high and low temperatures remains highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
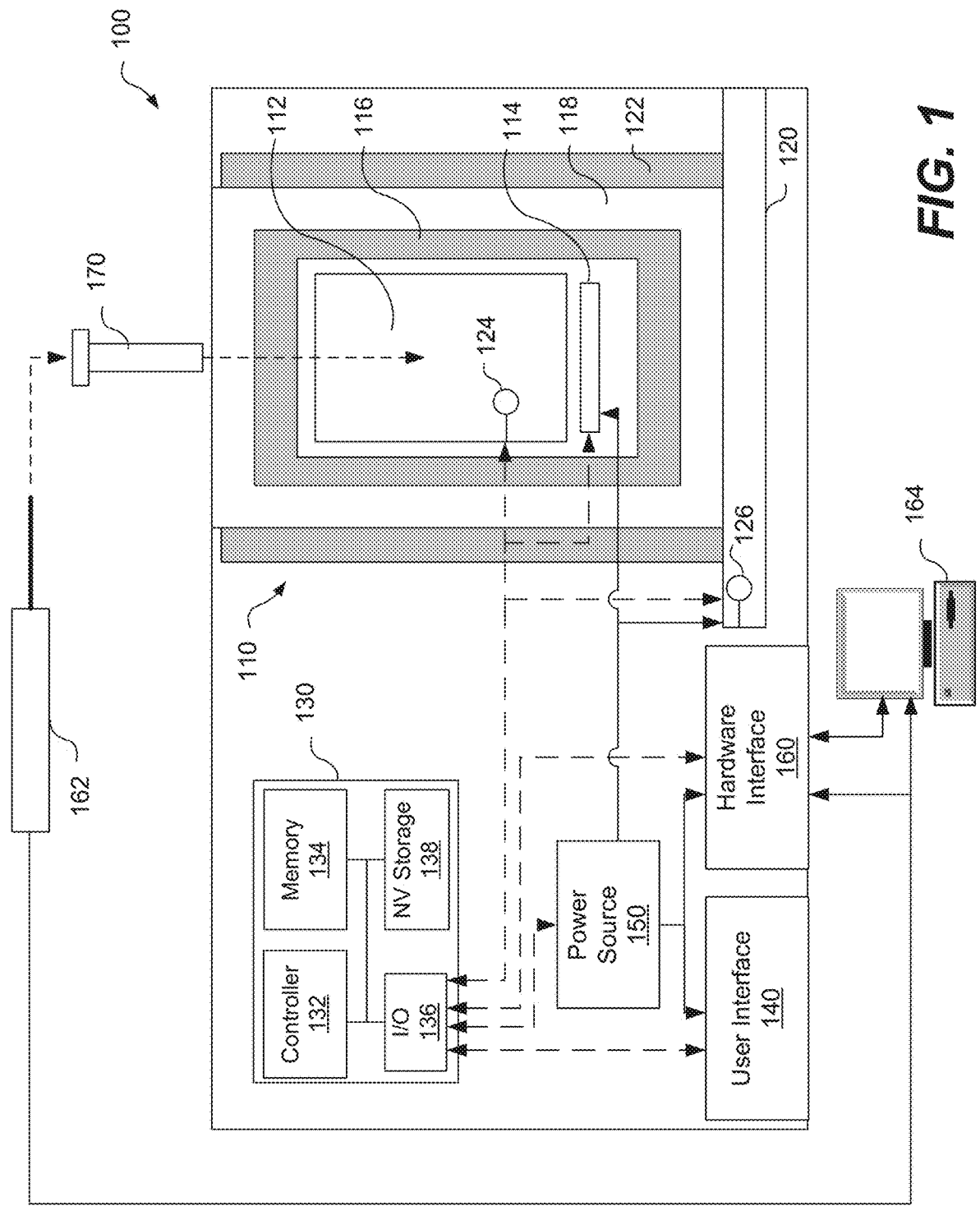
FIG. 1 shows a representation of a temperature control device.

In accordance with one aspect of the present disclosure, a temperature control device is disclosed, comprising: a test cell for receiving a sample to be measured; a heating subsystem configured to supply thermal energy to the test cell; a chill cell surrounding at least a portion of the test cell and the heating subsystem, and separated from the test cell and the heating subsystem by a thermal break, the chill cell being configured to remove thermal energy from the test cell when cooled; a cooling subsystem configured to cool the chill cell; and a controller configured to control the heating subsystem to control a temperature of a test volume inside the test cell to a set temperature.

In the temperature control device, the controller may be further configured to control the cooling subsystem for cooling the chill cell.

In the temperature control device, the cooling subsystem may comprise a thermoelectric cooler. The thermoelectric cooler may be mounted to the chill cell via a conductive interface.

In the temperature control device, the cooling subsystem may comprise a liquid nitrogen dewer and a member configured to conduct thermal energy from the chill cell to the liquid nitrogen dewer.

In the temperature control device, the cooling subsystem may comprise a heat exchanger disposed along an internal fluid flow path that is fluidly connectable to an external refrigeration circulator.

In the temperature control device, the cooling subsystem may comprise a refrigeration cycle device.

In the temperature control device, the heating subsystem may comprise an electric resistive heater.

In the temperature control device, the heating subsystem may comprise a thermoelectric heater.

In the temperature control device, the thermal break may comprise a gap filled with air or other gases, a vacuum gap, or be made from a material comprising at least one of ceramics and high-temperature insulative foams.

The temperature control device may further comprise insulation surrounding the chill cell.

In the temperature control device, one side or portion of the test cell and the chill cell may be either open or removable to facilitate insertion and removal of the sample to the test cell.

The temperature control device may further comprise a temperature sensor disposed within the test cell for measuring a temperature inside of the test cell.

In the temperature control device, the test cell may be configured for receiving a test sensor of a thermal property measurement device.

In accordance with another aspect of the present disclosure, a temperature control method is disclosed, comprising: receiving a set temperature of a test volume inside a test cell for measuring a thermal property of a sample when placed inside of the test cell; determining a measured temperature of the test volume; determining a difference between the set temperature and the measured temperature of the test volume; and while a chill cell surrounding at least a portion of the test cell and separated from the test cell by a thermal break is being cooled by a cooling subsystem, controlling supply of thermal energy to the test cell from a heating subsystem until the temperature of the test volume is equal to the set temperature.

In the temperature control method, the set temperature may be between −150 degrees Celsius and 800 degrees Celsius.

In the temperature control method, the set temperature may be received via user input at a user interface of the thermal property measurement device, or from an external device.

In the temperature control method, determining the measured temperature of the test volume may comprise receiving a temperature measurement from a temperature sensor inside the test cell.

The temperature control method may further comprise controlling the cooling subsystem to adjust thermal energy being removed from the test cell via the chill cell.

A temperature control device and a temperature control method used for measuring thermal properties of materials at high and low temperatures are disclosed herein. The temperature control device is configured for controlling a temperature of a test volume inside a test cell and is capable of providing both extremely high and low test volume temperatures quickly and precisely over a wide temperature range all within the same compact device. The temperature of the test volume is controlled using opposing heating and cooling by controlling a supply of thermal energy to the test cell from a heating subsystem while simultaneously removing thermal energy from the test cell using a cooling subsystem. The temperature control device may be compatible with and used by a variety of thermal property measurement devices, and may be particularly well-suited for transient testing methods for determining thermal properties of material samples.

Opposing heating and cooling allows for achieving more repeatable and stable temperatures of the test volume inside the test cell. Unlike conventional devices which operate like an oven and try to contain energy (and thus will not stabilize at ambient and lower temperatures), opposing cooling is able to remove the right amount of energy out of the system that allows for a more controllable test volume. Removing thermal energy from the test cell also plays a role in providing precision temperatures of the test volume at high temperatures by preventing overshoot. Moreover, when the test volume is heated to high temperatures, continuous cooling that removes thermal energy away from the test cell keeps nearby components cooler, and thus the temperature control device does not have to be designed for as high of temperatures, which helps to provide a more compact overall design.

The temperature control device comprises a test cell, which receives a sample to be measured, a heating subsystem configured to supply thermal energy to the test cell, and a chill cell surrounding at least a portion of the test cell and the heating subsystem and separated therefrom by a thermal break. The chill cell is configured to remove thermal energy from the test cell when cooled by a cooling subsystem. The temperature control device may implement different types of heating and cooling subsystems, some of which may be entirely housed within the thermal property measurement device, and others which may comprise internal components housed within the thermal property measurement device and that are connectable to one or more external components.

Incorporating a chill cell cooled by the cooling subsystem that is separated from the heating subsystem and the test cell by a thermal break helps to permit use of both the heating subsystem and the cooling subsystem in the same compact space. The temperature control device disclosed herein thus allows for a compact design that helps to realize lower costs, while being able to quickly achieve both very high and very low test volume temperatures. Specifically, at high temperatures the chill cell and the cooling subsystem will not be directly exposed to the heating subsystem or test cell, and thus a corresponding large increase in the temperature of the cooling subsystem can be avoided that may otherwise occur through conduction if the chill cell or cooling subsystem were directly in contact with the heating subsystem or test cell. Suppressing a temperature rise in the cooling subsystem allows the cooling subsystem to operate safely below its maximum temperature, even as the temperature of the test cell and heating subsystem becomes very hot. The need for high-temperature insulation and/or a quantity/thickness of insulation in the temperature control device can also be reduced. Additionally, efficiencies of the heating subsystem and cooling subsystem can be improved, and the heating subsystem can produce a same high temperature of the test volume using less power because the cooling subsystem is not removing thermal energy as quickly as a case where the cooling subsystem is in direct contact with the heating subsystem and/or test cell.

The temperature control device and temperature control method as disclosed herein thus allows users to test thermal properties of materials in a compact device at both very high temperatures and very low temperatures that are able to be achieved quickly and precisely.

Embodiments are described below, by way of example only, with reference to FIGS. 1-5.

FIG. 1 shows a representation of a temperature control device 100. The temperature control device 100 comprises a controlled temperature environment 110 configured to generate a controlled temperature within a test volume for testing thermal physical properties of material samples, and control equipment 130 for controlling the controlled temperature environment 110 to generate a set temperature in the test volume.

The temperature control device 100 may also comprise a user interface 140, a power source 150, and a hardware interface 160. The hardware interface 160 may interface with one or more external devices, such as a thermal property measurement device depicted as test sensor 162 used for measuring the thermal properties of sample materials, and a computer 164 that may be operated by a user. While the test sensor 162 is depicted in FIG. 1 as being the thermal property measurement device, the temperature control device 100 may be compatible with various types of thermal property measurement devices that are used to measure the thermal physical properties of material samples, as described in more detail herein.

The power source 150 may be used to supply power to one or more components of the temperature control device 100 including a heating subsystem 114, a cooling subsystem 120, various other components of the temperature control device 100, and in some instances the thermal property measurement device (e.g. the test sensor 162 depicted in FIG. 1).

The user interface 140 may be used to receive user inputs for setting a temperature of the test volume for performing measurements, and displaying data to the user indicating results of the measurements. The user interface 140 may, for the sake of example, comprise various push buttons and a display screen. Alternatively, or in addition to the user interface 140, the temperature control device 100 may be controlled by an external device such as the computer 164 (e.g. via a USB cable/port in the hardware interface 160), and output data indicating measurement results thereto.

The controlled temperature environment 110 of the temperature control device 100 comprises a test cell 112 that is configured for receiving a sample of material, e.g. in sample housing 170, whose thermal properties are to be measured. As described further herein, the test volume inside the test cell 112 may provide a moisture and oxygen free environment that is capable of being heated and cooled to very high and very low temperatures by the controlled temperature environment 110 for measuring thermal properties of the material sample. The test cell may contain a stand (not shown) or other apparatus for receiving the sample housing 170. At least one side or a portion of the test cell 112 may be removable for receiving the sample. For example, the test cell 112 may be comprised of two main parts (e.g. a top and bottom), that can be fastened together (e.g. via mating grooves and interlocking screws). Alternatively, one side or portion of the test cell 112 (e.g. the top) may be open. The test cell 112 is also configured to receive a thermal property measurement device such as the test sensor 162. The test cell 112 may for example comprise a metal container made of materials such as aluminum, copper, and other high thermal conductivity metals. The test cell 112 could also for example be made of stainless steel. The test cell 112 may be relatively small, though the size and configuration thereof may vary depending on the materials to be tested, the testing method, and the sensor device being used to measure the thermal properties of the sample material.

The controlled temperature environment 110 of the temperature control device 100 further comprises a heating subsystem 114 that is configured to supply thermal energy to the test cell 112, a chill cell 118 that surrounds at least a portion of the test cell 112 and the heating subsystem 114, and a cooling subsystem 120 configured to cool the chill cell 118. The controlled temperature environment further comprises a thermal break 116 separating the chill cell 118 from the test cell 112 and the heating subsystem 114. The temperature control device 100 may be implemented using various types of heating and cooling subsystems, as will be described in more detail with reference to FIGS. 2A-B and 3A-D. The heating and cooling subsystems may be entirely housed within the temperature control device 100, or they may comprise one or more internal components (e.g. piping, instrumentation, devices/apparatuses) that are connectable to one or more external components.

The heating subsystem 114 may for example be disposed within the test cell 112, directly connected with the test cell 112 and configured to supply thermal energy via conduction, and/or configured to heat an exterior of the test cell 112 (for example, heating a volume of air around the test cell 112). The chill cell 118 surrounds at least a portion of the test cell 112 and the heating subsystem 114. The chill cell 118 may, for example, surround all exterior surfaces of the test cell 112 and heating subsystem 114 except for a surface/area through which the test cell 112 is configured to receive the sample. Alternatively, the chill cell 118 may also be configured to surround the surface/area through which the test cell 112 receives the sample, and the corresponding portion of the chill cell 118 may be removable. The chill cell 118 may for example comprise a metal container made of high thermally conductive metal such as aluminum, copper, etc., which helps to facilitate removal of thermal energy away from the test cell 112 when cooled by the cooling subsystem 120.

The chill cell 118 is separated from the heating subsystem 114 and the test cell 112 by the thermal break 116. The thermal break 116 is configured to allow a controlled amount of heat transfer between the chill cell 118 and the test cell 112. The thermal break 116 may, for example, comprise a gap filled with air or other gases, a vacuum gap, or be comprised of materials such as ceramics, high-temperature insulative foams, etc. The implementation of the thermal break 116 between the chill cell 118 and the test cell 112 and heating subsystem 114 allows for the use of the cooling subsystem 120 and the heating subsystem 114 in a compact space to control a temperature of the test volume inside the test cell 112 to both very high and very low temperatures. When the temperature of the test cell 112 is high the thermal break 116 prevents large amounts of thermal energy from escaping thus keeping the chill cell 118 at an acceptable temperature. When the test cell 112 is required to be at a low temperature the thermal break 116 allows for thermal energy to be slowly transferred from the test cell 112 to the chill cell 118 thus cooling the test cell 112.

The thermal break 116 may be sized appropriately based on the configuration of the temperature control device 100 and the desired operating conditions. For example, a larger thermal break 116 may help to protect the operation of the cooling subsystem 120 at very high temperatures, however the cooling subsystem 120 will remove thermal energy from the test cell 112 more slowly. On the other hand, a smaller thermal break 116 may allow for the test cell 112 to be cooled to lower temperatures faster, however the cooling subsystem 120 may reach higher temperatures when the test cell is heated to very high temperatures, which could limit or damage the cooling subsystem 120.

The controlled temperature environment 110 of the thermal property measurement device may also comprise insulation 122 surrounding the chill cell 118 to prevent heat transfer to other components in the temperature control device 100. The insulation 122 may surround one or more surfaces of the chill cell 118, and there may be no insulation 122 in a region where heat transfer between the cooling subsystem 120 and the chill cell 118 occurs. The insulation 122 may for example be a gap filled with air or other gases, a vacuum gap, or be comprised of materials such as ceramics, high-temperature insulative foams, etc.

The control of the heating subsystem 114 and/or cooling subsystem 120 to produce a set temperature of the test volume in the test cell 112 may be controlled by the control equipment 130. The control equipment 130 depicted in FIG. 1 comprises a controller/processing unit 132 for executing instructions, which may for example comprise a central processing unit (CPU), a microprocessor, field programmable gate array (FPGA) or an application specific integrated circuit (ASIC), a non-transitory computer-readable memory 134, an input-output (I/O) interface 136, and non-volatile storage 138. The non-transitory computer-readable memory 134 may store computer-readable instructions which, when executed by the controller 132, configures the temperature control device to perform certain functionality as will be further described herein. In particular, the control equipment 130 may be configured for the controller 132 to execute a PID algorithm for sending outputs to control the heating subsystem 114 and in some implementations the cooling subsystem 120 to control the temperature of the test volume inside the test cell 112.

The I/O interface 136 couples the controller 132 to various components of the temperature control device 100. The I/O interface 136 may for example be used to exchange data between the controller 132 and the user interface 140, the power source 150, and the hardware interface 160. The I/O interface 136 may also couple the controller 132 to the heating subsystem 114 as well as various sensors for sending commands and receiving data. The controller 132 can send commands to the heating subsystem 114 to control heating of the test cell 112. If the heating subsystem 114 is controlled based on power supplied from the power source 150, the controller 132 can send commands to the power source 150 to control a power supplied to the heating subsystem 114. The temperature control device 100 may further comprise a temperature sensor 124 arranged within the test cell 112 that is configured to measure a temperature of the test volume. The temperature sensor 124 may be coupled with the controller 132 through the I/O interface 136 and send to the controller 132 a result of the temperature measurement or raw data indicative of the temperature of the test volume that can be used by the controller 132 to determine the measured temperature. In this manner, the controller 132 can calculate the difference between the set temperature and a measured temperature of the test volume to determine an output variable for controlling the heating subsystem 114. The I/O interface 136 may also couple the controller 132 to the cooling subsystem 120 and/or one or more sensors 126 associated with the cooling subsystem 120. The controller 132 may send commands for controlling the cooling subsystem 120, and if the cooling subsystem 120 is controlled by the power source 150 the controller 132 may send commands to the power source 150 to control a power supplied to the cooling subsystem 120.

The temperature control device 100 may be used in conjunction with various thermal property measurement devices to measure thermal physical properties including, but not limited to, thermal conductivity, thermal diffusivity, and specific heat, of various materials such as solids, liquids, pastes, and powders. The temperature control device 100 is configured for achieving an exact temperature of the test volume inside the test cell 112, and the thermal property measurement device takes a measurement of the sample inside the controlled temperature environment.

The temperature control device 100 may be configured to support operation of the thermal property measurement device directly (for example, in FIG. 1 the test sensor 162 may be connected to the temperature control device 100 through the hardware interface 160 and controlled by the control equipment 130), or alternatively the thermal property measurement device may be a stand-alone device that can be controlled on its own and/or by connection with the computer 164. For the sake of example, the temperature control device 100 may be configured for use with thermal property measurement devices that measure thermal properties using a transient hot wire or hot disk transient plane source sensors. However, a person skilled in the art will readily appreciate that the temperature control device 100 may be used for various other technologies where a sample is to be measured at an exact temperature and used for testing various material properties without departing from the scope of this disclosure.

In FIG. 1, the thermal property measurement device is shown as comprising the test sensor 162. In an example use case, a sample 170 of the material to be measured is placed in the test cell 112 and the sensor 162 is inserted into the sample. A set temperature is received (for example via user input at the user interface 140 or from the computer 164 via the hardware interface) and the controller 132 controls the heating subsystem 114 until the temperature of the test volume reaches the set temperature. The controller 132 may also control the cooling subsystem 120 for generating the set temperature in the test volume, or the cooling subsystem 120 may be constantly running at a pre-set operating point. The temperature control device 100 may be coupled with the test sensor 162 such that the controller 132 controls the power source 150 to heat the sensor wire of test sensor 162 using a constant current. Alternatively, the test sensor 162 may be controlled by a stand-alone thermal property measurement device (not shown) and/or the computer 164. The temperature rise of the material sample is recorded by monitoring the change in the electrical resistance of the wire of the test sensor 162. The test sensor data may be provided to the temperature control device 100 through the hardware interface 160 which may calculate a thermal physical property (e.g. thermal conductivity) of the sample and output the result to the user interface 140 and/or the computer 164. Alternatively, the test sensor data may be provided to a stand-alone thermal property measurement device and/or to the computer for processing of the test sensor data and output of the results.

Figure 2A:
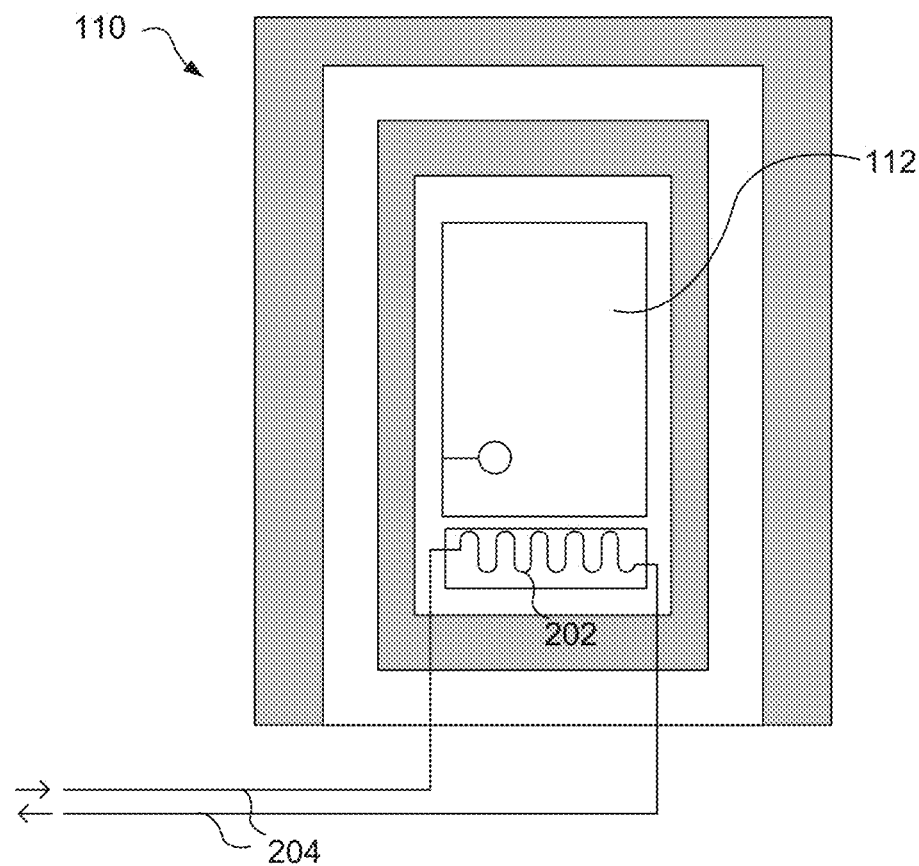
FIGS. 2A-B show representations of example heating subsystems used in the temperature control device.
Figure 2B:
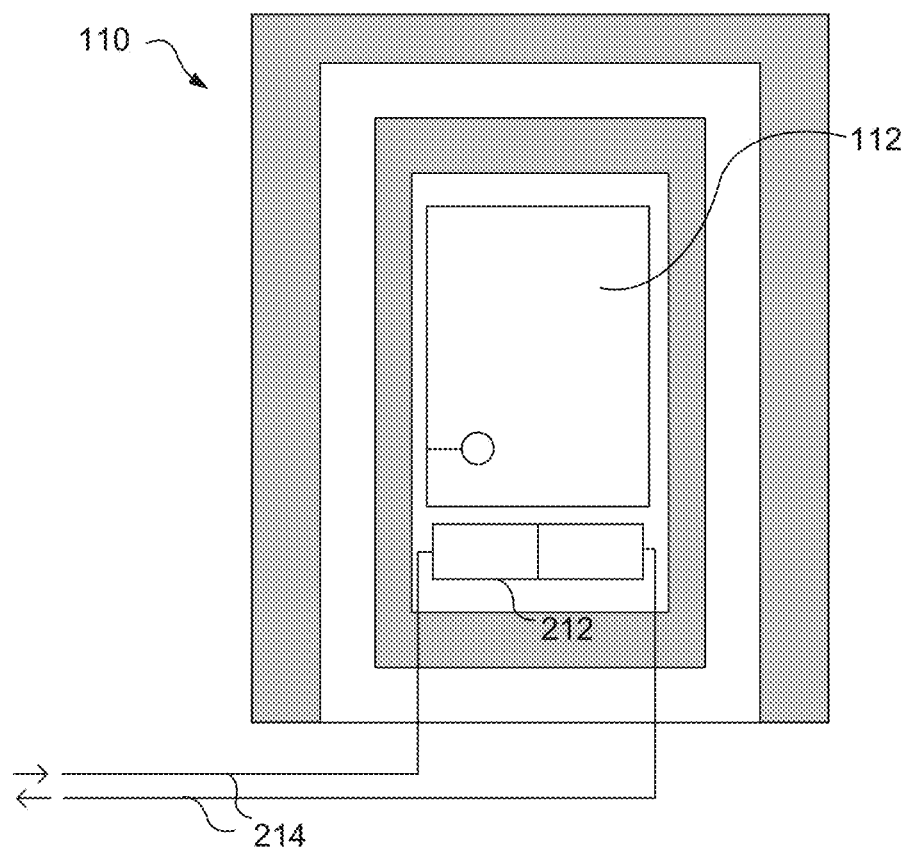

FIGS. 2A-B show representations of example heating subsystems used in the temperature control device 100. While the example heating subsystems are described and depicted separately, a combination of heating subsystems used in conjunction with one another may also be implemented in the temperature control device. FIGS. 2A-B show an enlarged view of the controlled temperature environment 110 of the temperature control device 100, and do not show the cooling subsystem 120 or other components of the temperature control device 100 for the sake of clarity. Reference numerals are not included to identify the same elements of the controlled temperature environment 110 as described with reference to FIG. 1, except where referred to.

FIG. 2A shows a configuration of the heating subsystem 114 using electrical resistance heaters 202. The electrical resistance heaters 202 may be integrated in a disk shape conforming to the shape of the test cell surface. For example, the electrical resistance heaters 102 may comprise a Kapton™ heater disk. The electrical resistance heaters 202 may be in direct contact with the test cell 112. While depicted in FIG. 2A as being located at the bottom of the test cell 112, the electrical resistance heaters 202 may be located at the sides or top of the test cell 112. The electrical resistance heaters 202 may be coupled with the controller 132 (e.g. through power source 150, see FIG. 1) via power lines 204. The controller 132 may be configured to generate an output (e.g. duty cycle) for controlling an average power supplied from the power source 150 to the electrical resistance heaters 202.

FIG. 2B shows a configuration of the heating subsystem 114 using thermoelectric heaters 212. The thermoelectric heaters 212 may for example be a thermoelectric heat pump, Peltier tile, etc. The thermoelectric heaters 212 may be in direct contact with the test cell 112. While depicted in FIG. 2B as being located at the bottom of the test cell 112, the thermoelectric heaters 212 may be located at the sides or top of the test cell 112. The thermoelectric heaters 212 may be coupled with the controller 132 (e.g. through power source 150, see FIG. 1) via power lines 214. The thermoelectric heaters may be provided in plate form, and the controller 132 may be configured to control an output (e.g. duty cycle) for controlling a current supplied to the thermoelectric heaters 212 for controlling a temperature difference in the thermoelectric heaters and causing a release of thermal energy. In FIG. 2B, the thermoelectric heaters 212 and the current being supplied via power lines 214 would be configured so that the top of the thermoelectric heaters 212 are the hot side and the bottom of the thermoelectric heaters 212 are the cool side.

FIGS. 3A-D show representations of example cooling subsystems used in the temperature control device 100. While the example cooling subsystems are described and depicted separately, a combination of cooling subsystems used in conjunction with one another may also be implemented in the temperature control device. FIGS. 3A-D show an enlarged view of the controlled temperature environment 110 of the temperature control device 100, and do not show other components of the temperature control device 100 for the sake of clarity. Reference numerals are not included to identify the same elements of the controlled temperature environment 110 as described with reference to FIG. 1, except where referred to.

Figure 3A:
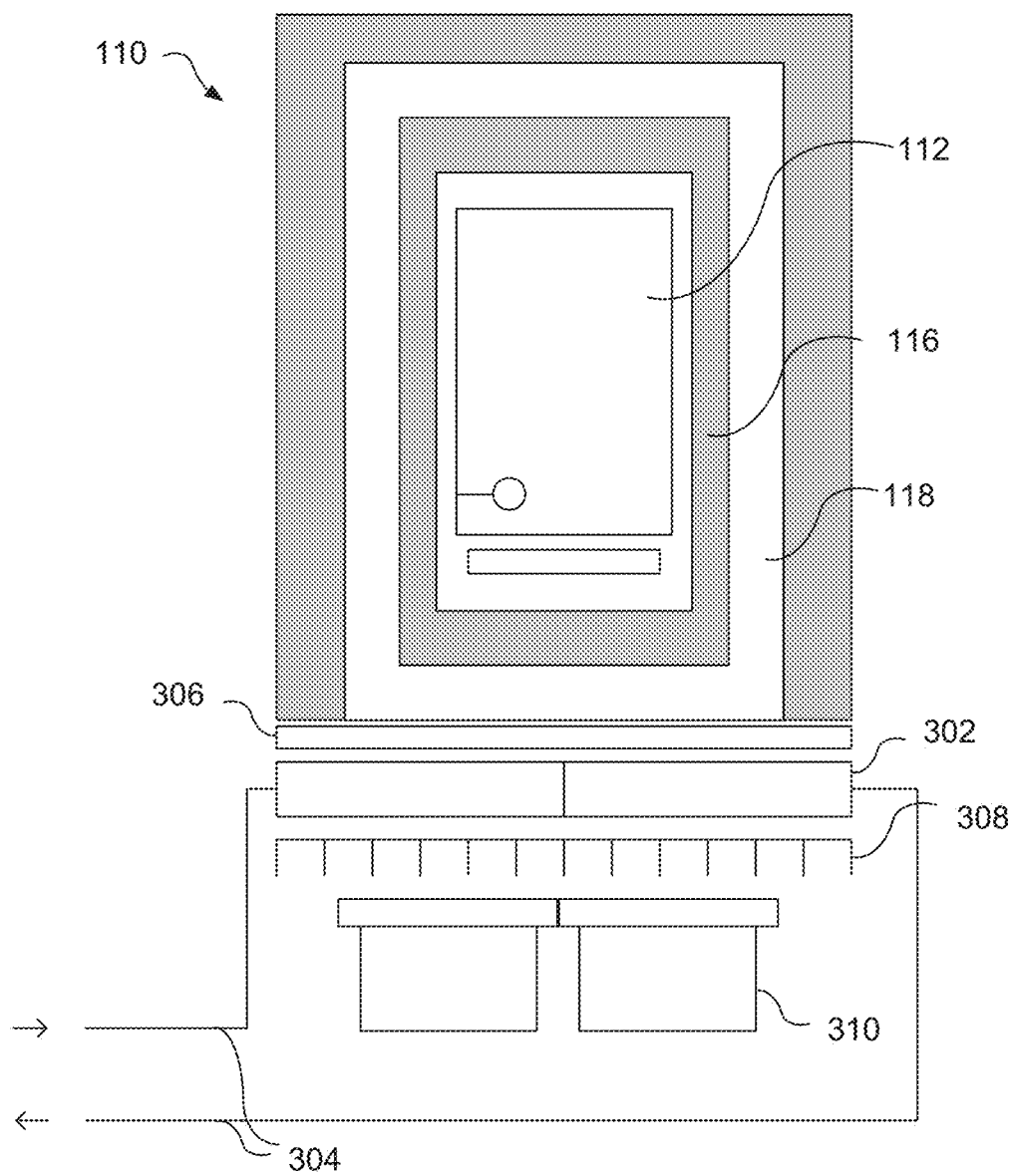
FIGS. 3A-D show representations of example cooling subsystems used in the temperature control device.

FIG. 3A shows a configuration of the cooling subsystem 120 using thermoelectric coolers 302. The thermoelectric coolers 302 may for example be a thermoelectric heat pump, Peltier tile, solid state refrigerator, etc. The thermoelectric coolers 302 may be particularly advantageous in that there are no moving parts, are invulnerable to leaking, have a relatively long life, have a small and flexible form factor, and can be completely internal to the temperature control device (i.e. no set up or external chillers required).

The thermoelectric coolers 302 may be coupled with the controller 132 (e.g. through power source 150, see FIG. 1) via power lines 304. The thermoelectric coolers 302 may be in plate form, and the controller 132 may be configured to control an output (e.g. duty cycle) for controlling a current supplied to the thermoelectric heaters 302 from the power source 150 for controlling a temperature difference in the thermoelectric coolers and causing absorption of thermal energy. In FIG. 3A, the thermoelectric coolers 302 and the current being supplied via power lines 304 would be configured so that the top of the thermoelectric coolers 302 are the cool side and the bottom of the thermoelectric coolers 302 are the hot side. While depicted in FIG. 3A as being located at the bottom of the chill cell 118, the thermoelectric coolers 302 may be located at the sides or top of the chill cell 118 instead.

The thermoelectric coolers 302 may be mounted to the chill cell 118 directly, or alternatively the thermoelectric coolers 302 may be mounted via an interface 306, which may for example be made of copper or another metal with a high heat transfer coefficient. Screws may be used to fasten the thermoelectric coolers 302 to the interface 306. To cool the hot side (in FIG. 3A, the bottom) of the thermoelectric coolers 302, a finned heatsink 308 may be used with a fan 310 blowing external air onto the heatsink 308. One or more other cooling subsystems, such as those described with reference to FIGS. 3B-D, could also be implemented to cool the hot side of the thermoelectric coolers 302.

Figure 3B:
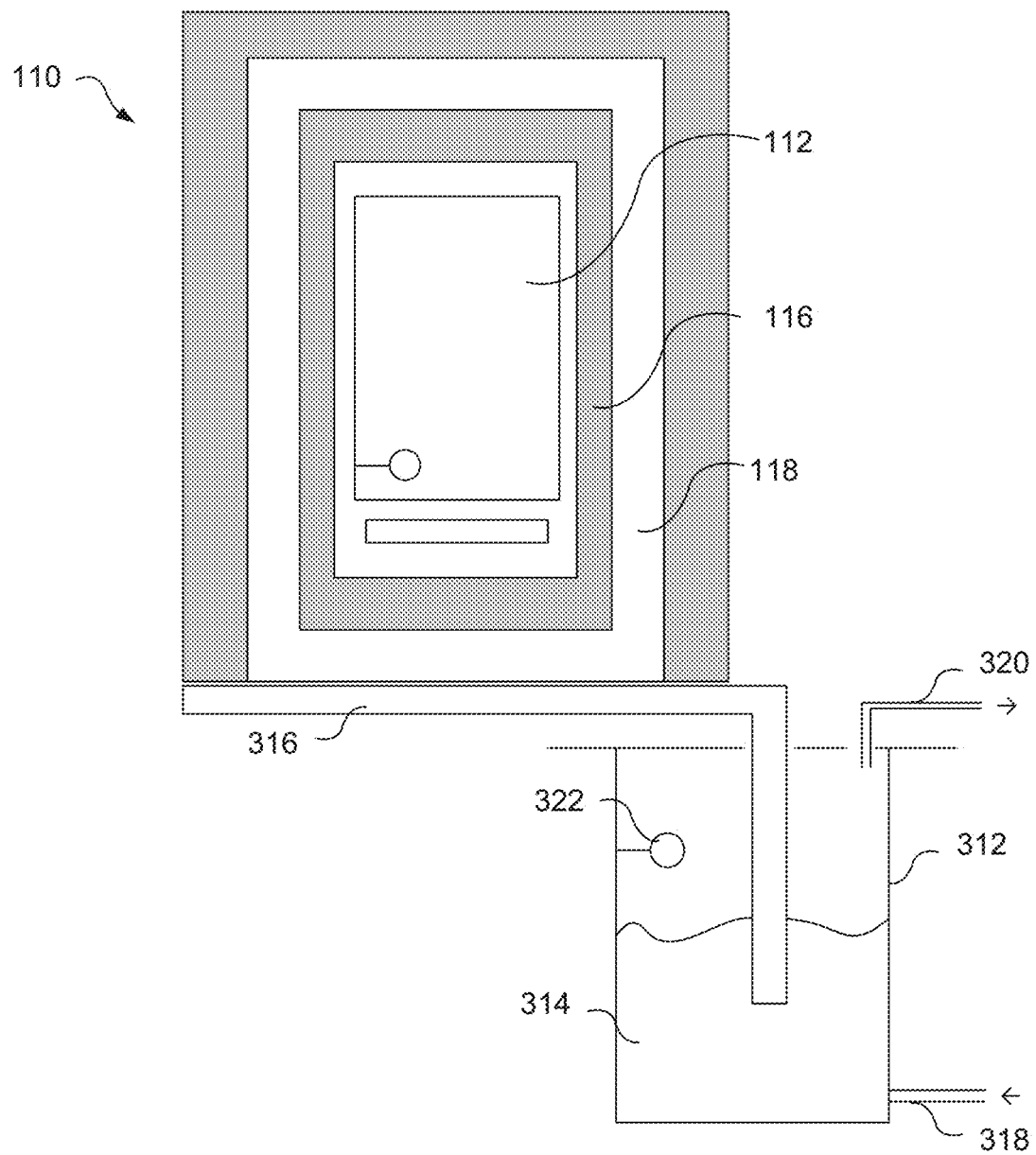

FIG. 3B shows a configuration of the cooling subsystem 120 using a liquid nitrogen system. Using a liquid nitrogen system may be particularly advantageous for achieving very low temperatures, though it may not be able to operate at as high of temperatures as other implementations of cooling subsystems.

The liquid nitrogen system comprises a dewer 312 containing a bath of liquid nitrogen 314 and a member 316 extending adjacent to the chill cell 118 and that extends into the liquid nitrogen 314 in the dewer 312. The member 316 acts as a thermal conductor and pulls thermal energy from the chill cell 118 into the liquid nitrogen 314, which then evaporates and is replaced by more liquid nitrogen. The member 316 may for example be a copper rod, and may be directly connected to the chill cell 118. Further, while the member 316 is depicted in FIG. 3B as extending adjacent to the bottom of the chill cell 118, the member 316 may extend adjacent to the sides or top of the chill cell 118.

The liquid nitrogen system further comprises a liquid nitrogen intake line 318 for supplying liquid nitrogen to the dewer 312, and a gas exhaust line 320 for venting the evaporated nitrogen gas, thus ensuring a constant supply of fresh liquid nitrogen. The liquid nitrogen intake line 318 and the gas exhaust line 320 of the cooling subsystem may be respectively connected to an external liquid nitrogen supply line supplying the liquid nitrogen and to an external exhaust line (not shown).

The liquid nitrogen system may also comprise various sensors (depicted generally as sensor 322). For example, the sensors may comprise an over fill limit sensor, fill sensor, and bottom limit sensor, which may be used for controlling the amount of liquid nitrogen 314 in the dewer 312. The sensors may be coupled with the controller 132 (see FIG. 1) or an external control mechanism such as a valve for controlling the supply of liquid nitrogen along the external supply line (not shown).

Figure 3C:
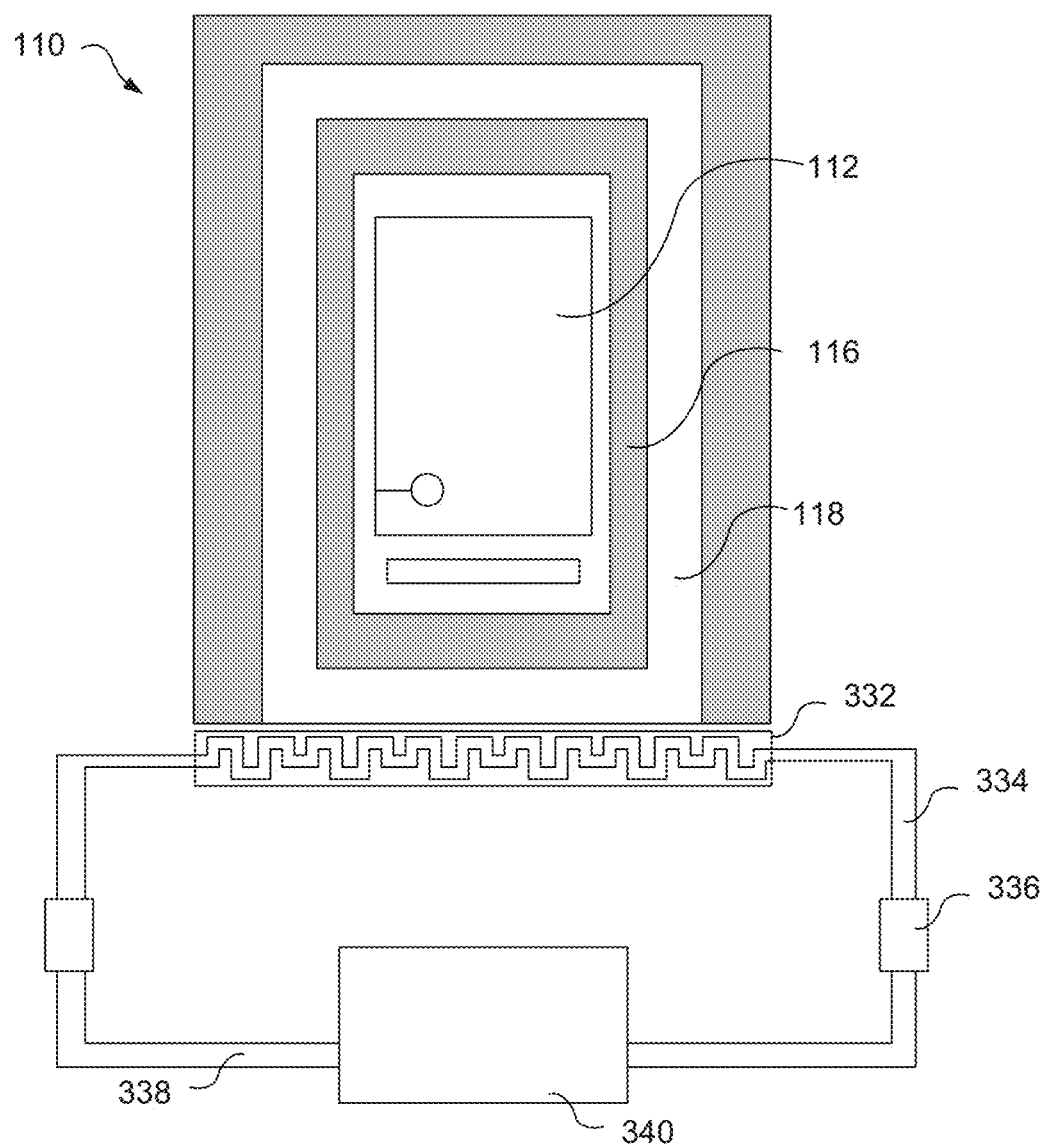

FIG. 3C shows a configuration of the cooling subsystem 120 using a circulating liquid system. Use of the circulating cooling system may provide high cooling capacity that can be used for achieving a large temperature range with a relatively easy set-up. The cooling subsystem comprises internal fluid flow piping 334 connected to a heat exchanger 332 that interfaces with the chill cell 118. An interface 336 of the temperature control device may be used to allow for connection to an external fluid flow piping 338 that may be connected with an external refrigerated circulator 340.

In operation, the external refrigerated circulator 340 cools a fluid and pumps the cooled fluid through the external fluid flow piping 338 and into the internal fluid flow piping 334 of the temperature control device 100 via interface 326. The cool liquid flows through the internal fluid flow piping 334 and enters the heat exchanger 332, where thermal energy is pulled away from the chill cell 118 and the liquid is gradually heated. The warm liquid exits the heat exchanger 332, flows through the internal fluid flow piping 334 and external fluid flow piping 338 back towards the external refrigerated circulator 340, where it is again cooled and the cycle repeats.

Figure 3D:
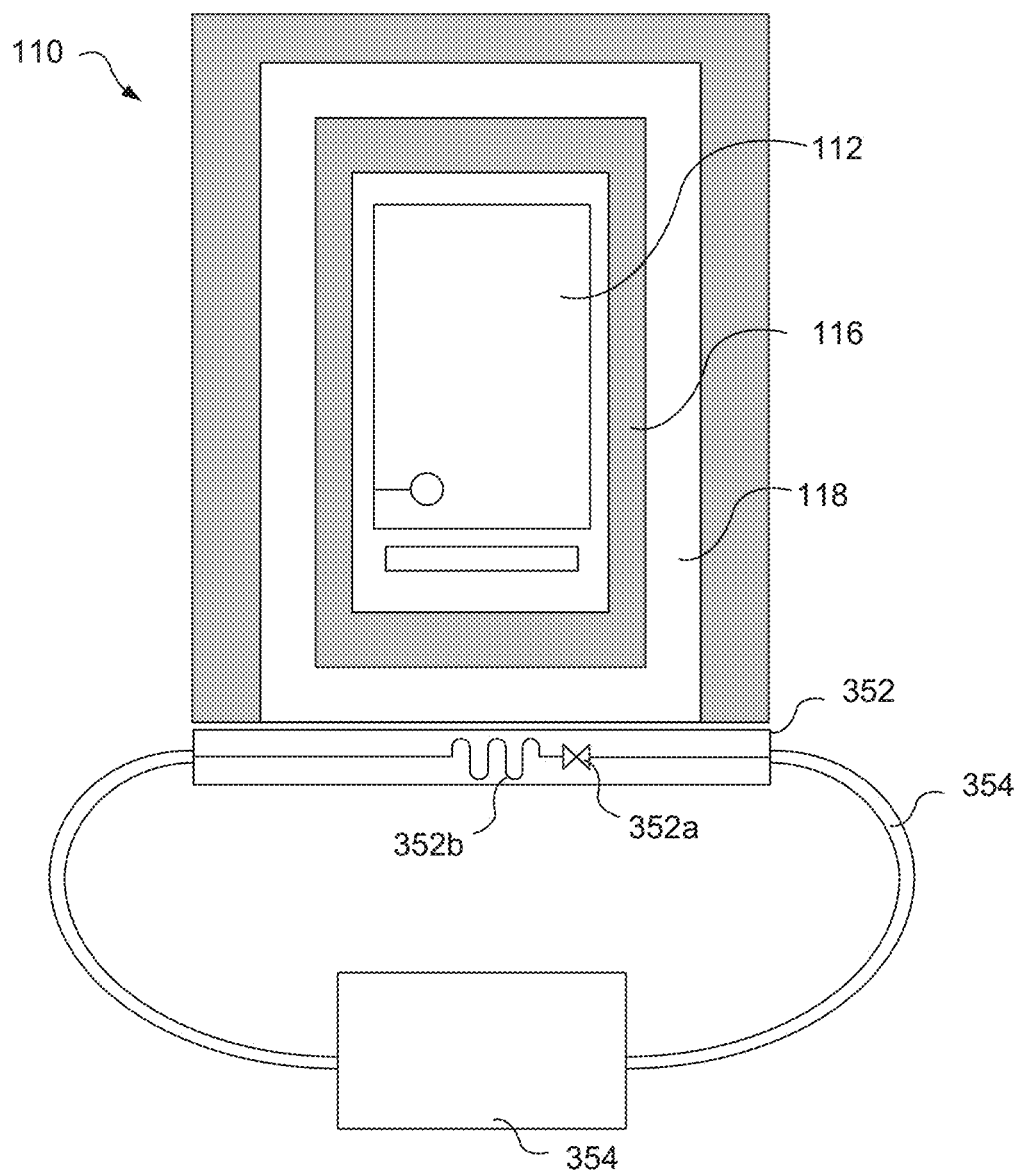

FIG. 3D shows a configuration of the cooling subsystem 120 using a refrigeration system. Use of the refrigerant system may provide high cooling capacity that can result in achieving low temperatures inside the test cell 112 very quickly. The refrigeration system comprises a hose 354 that connects an evaporation unit 352 and a compression cycle refrigeration unit 356. The evaporation unit 352 interfaces with the chill cell 118. The evaporation unit 352 may comprise an expansion valve 352a and an evaporator 352b. The vapor compression cycle refrigeration unit 356 may comprise a condenser and a compressor (not shown).

In operation, the vapor compression cycle refrigeration unit 356 condenses a refrigerant to a liquid form, which is transferred through the hose 354 and into the evaporation unit 352. The evaporation unit 352 evaporates the refrigerant into a gaseous form, which pulls thermal energy from the chill cell 118. The refrigerant in gaseous form is then transferred back to the external vapor compression cycle refrigeration unit 356, and the cycle repeats.

With each of the cooling subsystems described above, because of the thermal break 116 that separates the chill cell 118 from the testing cell 112, a temperature of the cooling subsystems can be prevented from becoming excessively high even at high test volume temperatures inside the test cell 112, and thus efficiencies of the cooling subsystems can be maintained. Accordingly, the above-described cooling subsystems can be used in a compact space with the test cell 112 and the heating subsystem, even when the test volume of the test cell 112 is at temperatures exceeding a design temperature of the cooling subsystems.

The temperature control device 100 can be configured using different combinations of heating and cooling subsystems to provide a temperature control device that is capable of achieving different ranges of extreme high and low temperatures, such as between −150 degrees Celsius to 800 degrees Celsius. For example, a temperature control device that is more particularly configured for achieving lower test temperatures may use liquid nitrogen cooling for the cooling subsystem, and can readily achieve test volume temperatures of −150 degrees Celsius, though may be more limited of achieving high temperature ranges of up to approximately 50 degrees Celsius. On the other hand, a temperature control device that implements resistance heaters for the heating subsystem and liquid cooling for the cooling subsystem can achieve temperatures of up to 800 degrees Celsius, for example.

Figure 4:
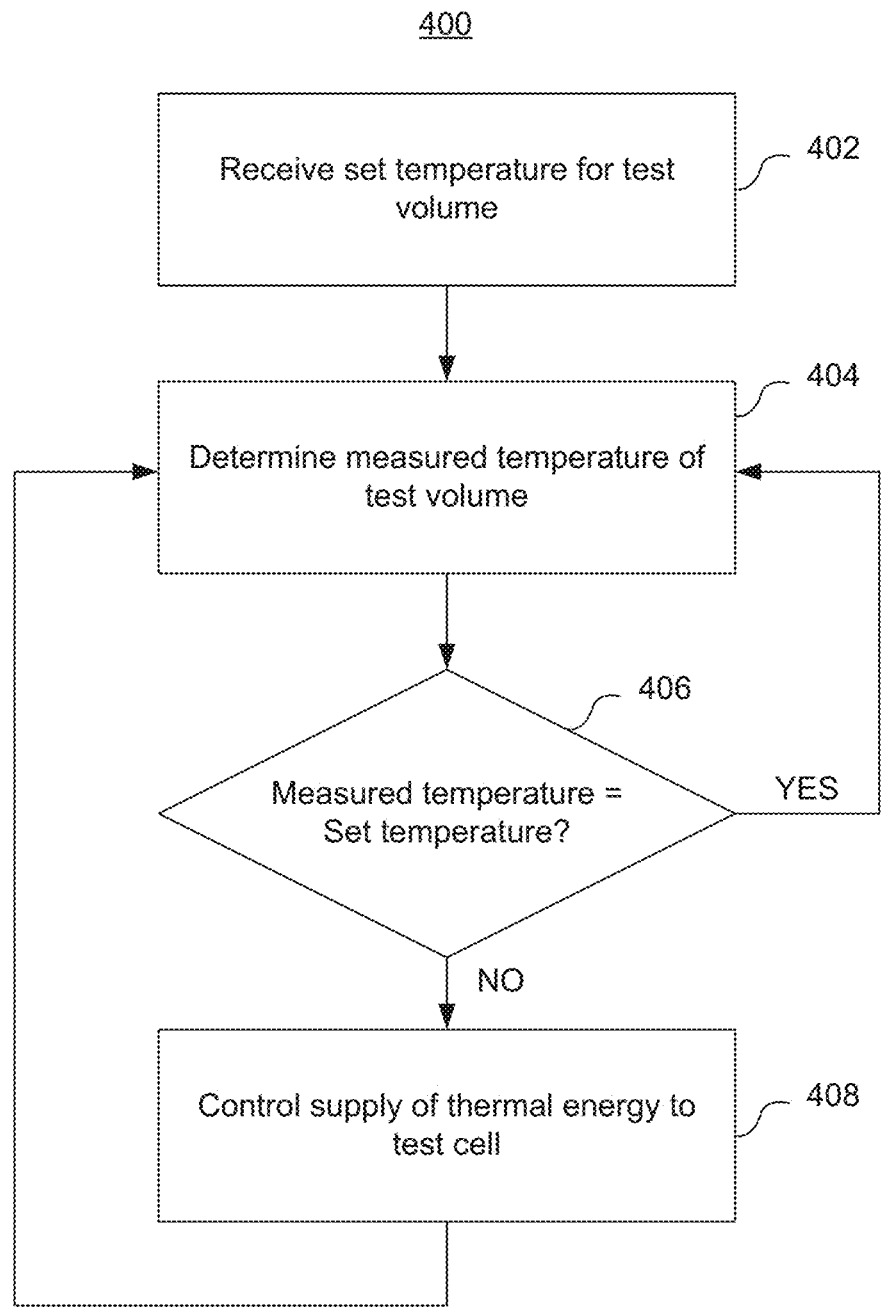
FIG. 4 shows a temperature control method.

FIG. 4 shows a temperature control method 400 for a temperature control device. The temperature control method 400 may be implemented in the temperature control device 100 to control a temperature of the test volume inside the test cell. The temperature control method 400 may be executed by the controller 132, and the method may be encompassed as computer-executable instructions stored on a non-transitory computer-readable medium that is executed by the controller 132.

The method 400 comprises receiving a set temperature for the test volume of the test cell (402). The set temperature may for example be received from user input via a user interface, and/or from an external device such as a computer communicatively connected to the thermal property measurement device.

A measured temperature of the test volume is determined (404). For example, the controller may receive temperature measurements from a temperature sensor located inside the test cell. The temperature measurements may be received continuously, or at predetermined intervals (e.g. every 10 seconds).

A determination is made as to whether the measured temperature of the test volume is equal to the set temperature (406). This determination may comprise calculating a difference between the measured temperature and the set temperature and comparing the difference to a predetermined threshold (e.g. 1 degrees Celsius). If the difference is within the predetermined threshold, the measured temperature is determined to be equal to the set temperature, and if the difference is outside of the predetermined threshold, the measured temperature is determined not to be equal to the set temperature.

When it is determined that the measured temperature of the test volume is equal to the set temperature (YES at 406), the method continues to determine the measured temperature of the test volume (404).

When it is determined that the measured temperature of the test volume is not equal to the set temperature (NO at 406), a supply of thermal energy to the test cell is controlled (408). Controlling the supply of thermal energy to the test cell may be performed by adjusting an operating point of the heating subsystem. For example, where the measured temperature of the test volume is less than the set temperature, the heating subsystem may be controlled to supply more thermal energy to the test cell. If the heating subsystem is supplying a maximum amount of thermal energy, controlling the supply of thermal energy may comprise maintaining supply of the maximum amount. Where the measured temperature of the test volume is greater than the set temperature, the heating subsystem may be controlled to supply less thermal energy to the test cell. If the heating subsystem is supplying a minimum amount of thermal energy to the test cell (e.g. the heating subsystem is turned off), controlling the supply of thermal energy may comprise maintaining the heating subsystem in this operating state.

The difference between the measured temperature and the set temperature of the test volume may be passed to a PID algorithm which determines an output parameter for control of the heating subsystem. Where the heating subsystem comprises an electric resistance heater or a thermoelectric heater, the output parameter may for example be a duty cycle that is passed to a PWM interface for controlling the average power supplied to the heating subsystem and thus the thermal energy that is supplied to the test cell from the heating subsystem. Where a microcontroller is implemented in the thermal property measurement device, a discrete form of the PID algorithm may be used. To avoid duty cycle variation limitations, non-linearity at negative duty cycles on a resistive heater, and having higher than 100% duty cycle, limits and bounds of the output parameter may be pre-set. The method returns to determining the measured temperature of the test volume (404).

During the above method 400, the chill cell may be continuously cooled by the cooling subsystem. In some implementations, the method may also comprise adjusting control of the cooling subsystem to control an amount of thermal energy removed from the test cell. For example, the controller may be configured to control power supplied to the thermoelectric cooler, and/or control a flow rate of fluid through the heat exchanger. However, in other implementations the cooling subsystem may just run at a given operating point and the temperature of the test volume be controlled solely by controlling an operation of the heating subsystem.

As described above, cooling the chill cell using the cooling subsystem while controlling a temperature of the test volume by controlling the heating subsystem is advantageous when the set temperature is at very low, ambient, and very high temperatures. At low and ambient temperatures, a repeatable and stable temperature can be achieved by actively removing thermal energy from the test cell. At high temperatures, the cooling helps to prevent overshoot of the test volume temperature while also keeping surrounding components of the temperature control device cooler, thus reducing the need for high-temperature insulation and/or large distances separating components. The temperature control method thus allows for accurately and quickly obtaining a wide range of temperatures of a test cell in a compact controlled temperature environment.

Figure 5:
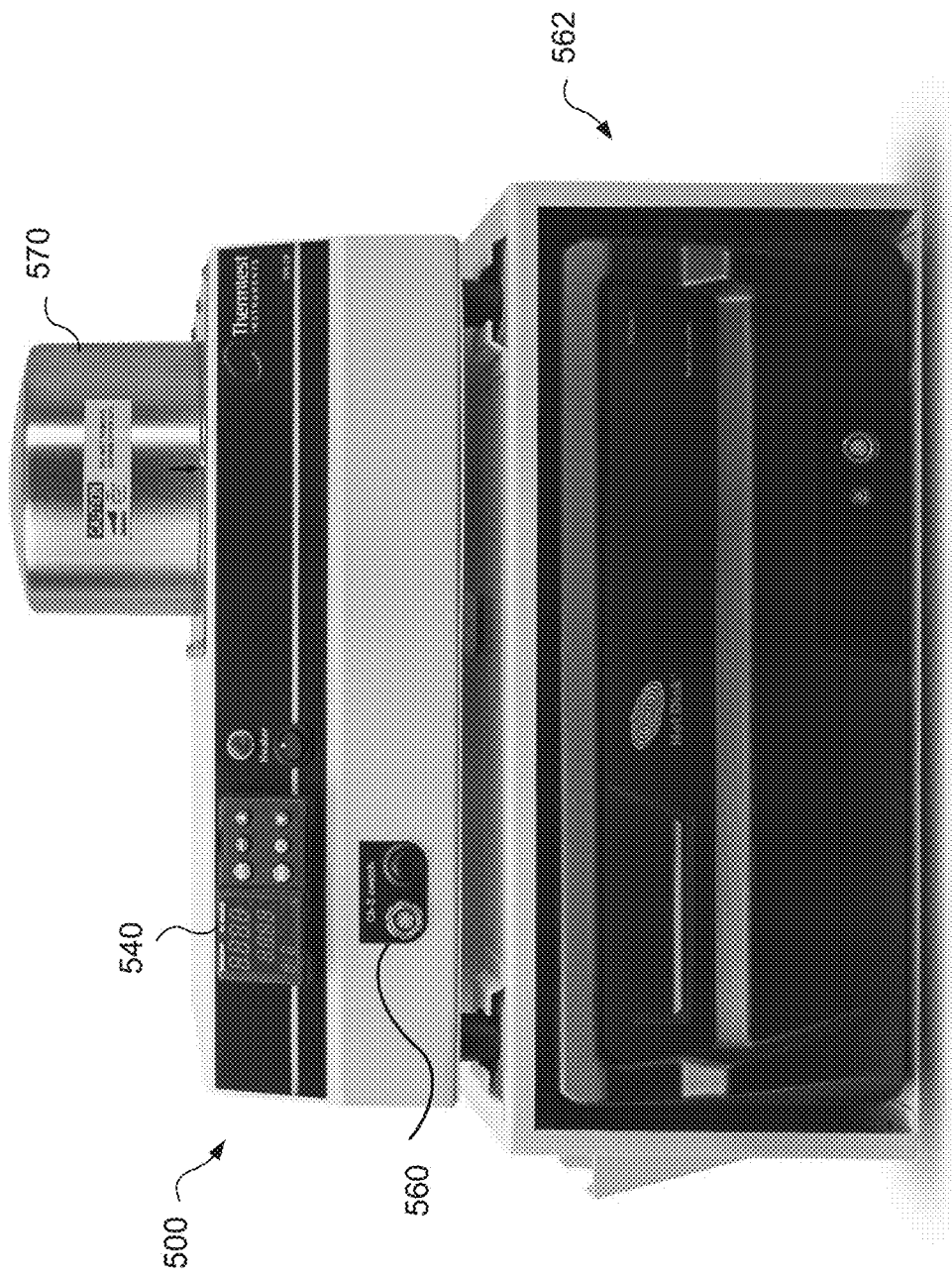
FIG. 5 shows an example of a thermal property measurement device being used with a temperature control device.

FIG. 5 shows an example thermal property measurement 562 device being used with a temperature control device 500. In FIG. 5, the temperature control device 500 corresponds to the temperature control device 100 represented in FIG. 1, and is configured for use with a Hot Disk transient plane source sensor (not shown). As seen in FIG. 5, the temperature control device 500 comprises user interface 540, a hardware interface 560, and there is a sample housing 570 that is mounted on an internal test cell (not shown). The bottom device is a thermal property measurement device 562, which may be manufactured completely separate from the temperature control device 500. The thermal property measurement device 562 uses transient plane source measurements via a transient plane source sensor (not shown) that may be placed within the test cell and enclosed within the sample housing 570. In this regard, the temperature control device 500 is configured to receive the sensor of the thermal property measurement device 562. The temperature control device 500 is used to get the sample to an exact temperature (for example, using the temperature control method 400), and the thermal property measurement device 562 takes a measurement of the sample inside the temperature control device 500.

It would be appreciated by one of ordinary skill in the art that the system and components shown in the figures may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

The invention claimed is:

1. A temperature control device for use in measuring thermal properties of materials, comprising:
   a test cell for receiving a sample to be measured;
   a heating subsystem configured to supply thermal energy to the test cell;
   a chill cell surrounding at least a portion of the test cell and the heating subsystem;
   a thermal break separating the chill cell from the test cell and the heating subsystem, wherein the chill cell is configured to remove thermal energy from the test cell through the thermal break when cooled, and the thermal break is configured to allow a controlled amount of heat transfer between the chill cell and the test cell;
   a cooling subsystem configured to cool the chill cell; and
   a controller configured to control the heating subsystem to supply thermal energy to the test cell while thermal energy is simultaneously removed from the test cell using the cooling subsystem, to control a temperature of a test volume inside the test cell to a set temperature.

2. The temperature control device of claim 1, wherein the controller is further configured to control the cooling subsystem for cooling the chill cell.

3. The temperature control device of claim 1, wherein the cooling subsystem comprises a thermoelectric cooler.

4. The temperature control device of claim 3, wherein the thermoelectric cooler is mounted to the chill cell via a conductive interface.

5. The temperature control device of claim 1, wherein the cooling subsystem comprises a liquid nitrogen dewer and a member configured to conduct thermal energy from the chill cell to the liquid nitrogen dewer.

6. The temperature control device of claim 1, wherein the cooling subsystem comprises a heat exchanger disposed along an internal fluid flow path that is fluidly connectable to an external refrigeration circulator.

7. The temperature control device of claim 1, wherein the cooling subsystem comprises a refrigeration cycle device.

8. The temperature control device of claim 1, wherein the heating subsystem comprises an electric resistive heater.

9. The temperature control device of claim 1, wherein the heating subsystem comprises a thermoelectric heater.

10. The temperature control device of claim 1, wherein the thermal break comprises a gap filled with air or other gases, a vacuum gap, or is made from a material comprising at least one of ceramics and high-temperature insulative foams.

11. The temperature control device of claim 1, further comprising insulation surrounding the chill cell.

12. The temperature control device of claim 1, wherein one side or portion of the test cell and the chill cell are either open or removable to facilitate insertion and removal of the sample to the test cell.

13. The temperature control device of claim 1, further comprising a temperature sensor disposed within the test cell for measuring a temperature inside of the test cell.

14. The temperature control device of claim 1, wherein the test cell is configured for receiving a test sensor of a thermal property measurement device.

15. A temperature control method executed at a temperature control device used for measuring thermal properties of materials, comprising:
   receiving a set temperature of a test volume inside a test cell for measuring a thermal property of a sample when placed inside of the test cell;
   determining a measured temperature of the test volume;
   determining a difference between the set temperature and the measured temperature of the test volume; and
   while a chill cell surrounding at least a portion of the test cell and separated from the test cell by a thermal break is being cooled by a cooling subsystem to remove thermal energy from the test cell through the thermal break, controlling supply of thermal energy to the test cell from a heating subsystem until the temperature of the test volume is equal to the set temperature, wherein the thermal break is configured to allow a controlled amount of heat transfer between the chill cell and the test cell.

16. The temperature control method of claim 15, wherein the set temperature is between −150 degrees Celsius and 800 degrees Celsius.

17. The temperature control method of claim 15, wherein the set temperature is received via user input at a user interface of the temperature control device, or from an external device.

18. The temperature control method of claim 15, wherein determining the measured temperature of the test volume comprises receiving a temperature measurement from a temperature sensor inside the test cell.

19. The temperature control method of claim 15, further comprising controlling the cooling subsystem to adjust thermal energy being removed from the test cell via the chill cell.

20. The temperature control device of claim 1, wherein the chill cell surrounds the test cell and the heating subsystem.

* * * * *